Nov. 17, 1964     H. W. LEWIS ETAL     3,157,333
MACHINE FOR OPERATING ON ELONGATED WORKPIECES
Filed May 12, 1961                                                10 Sheets-Sheet 6
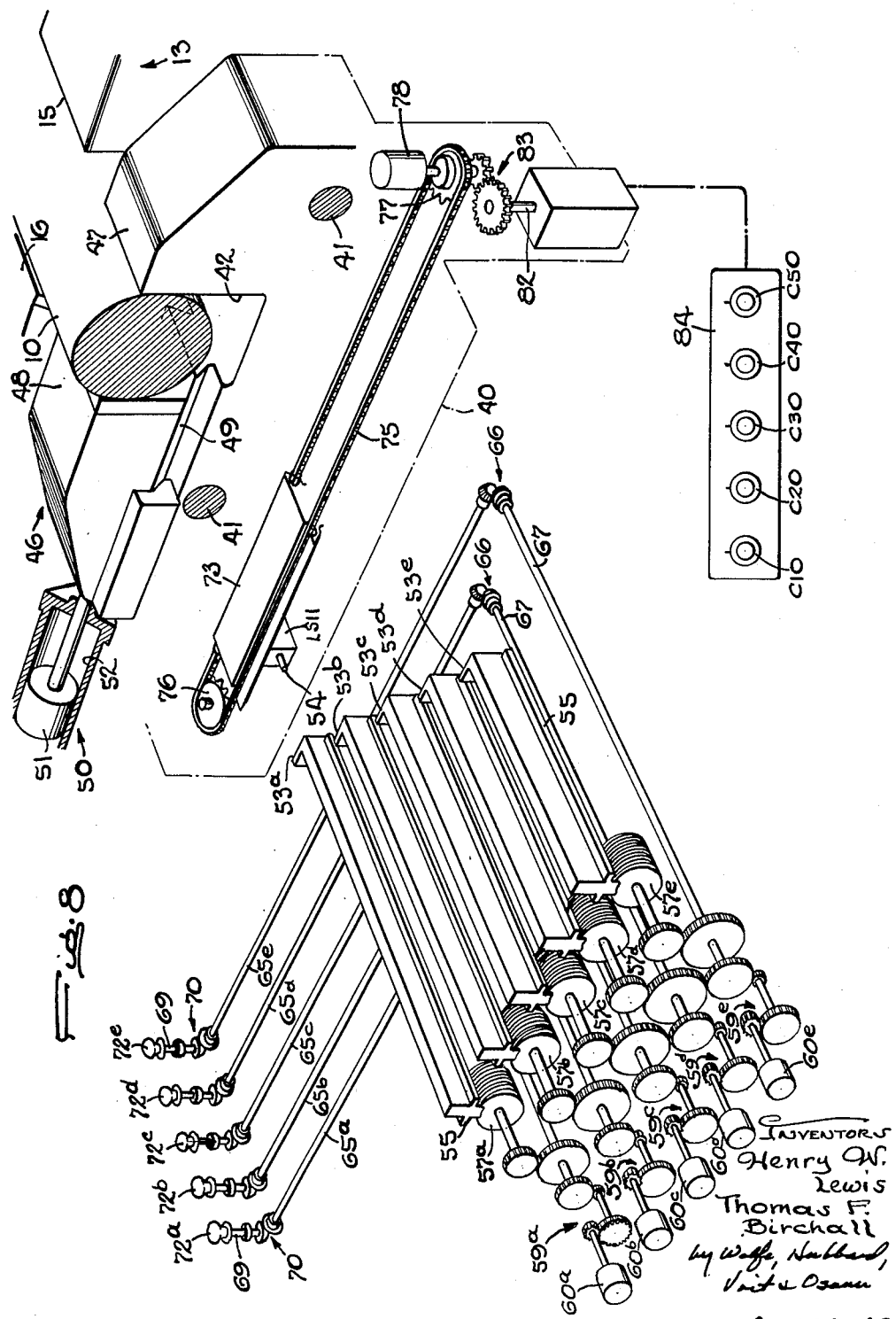

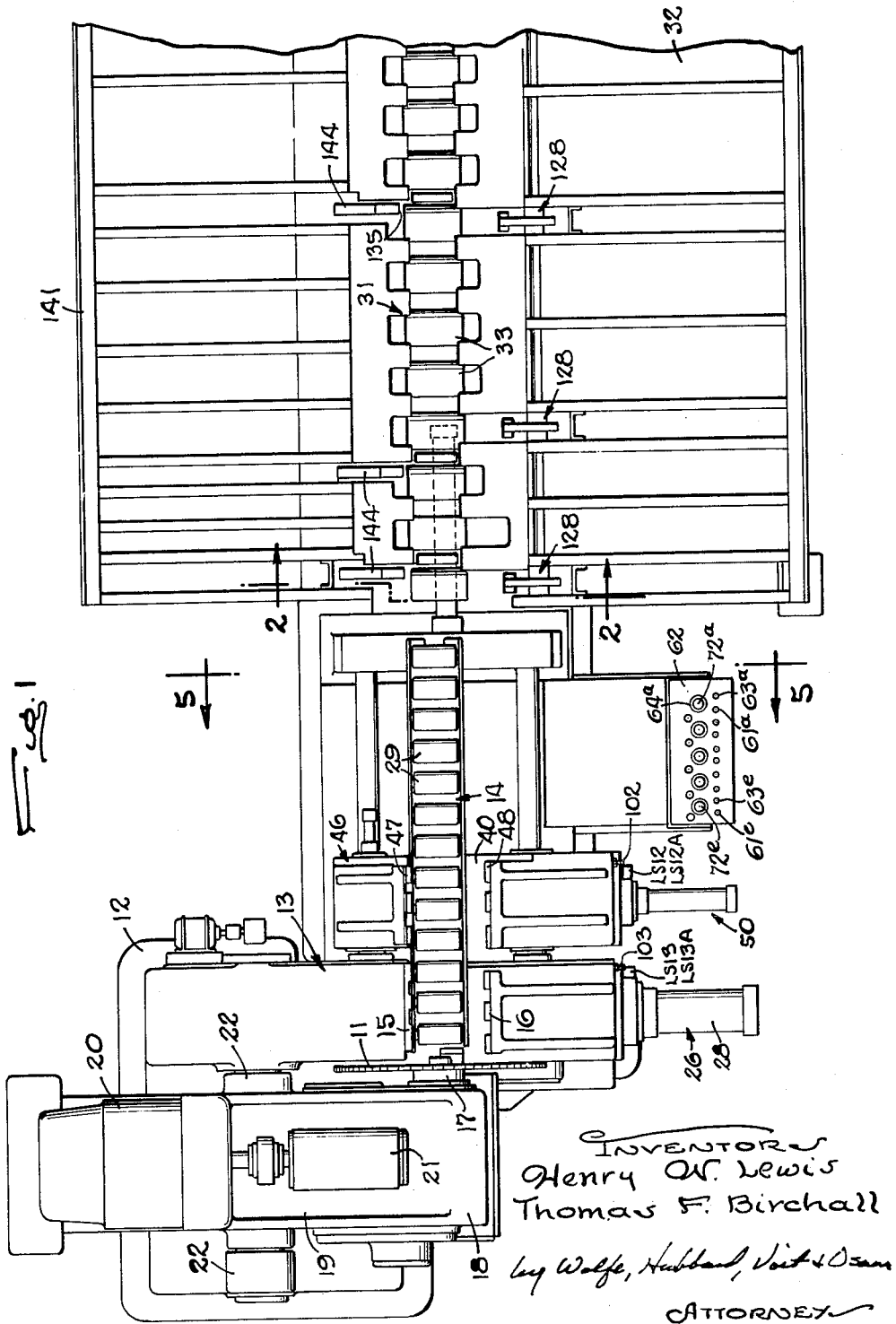

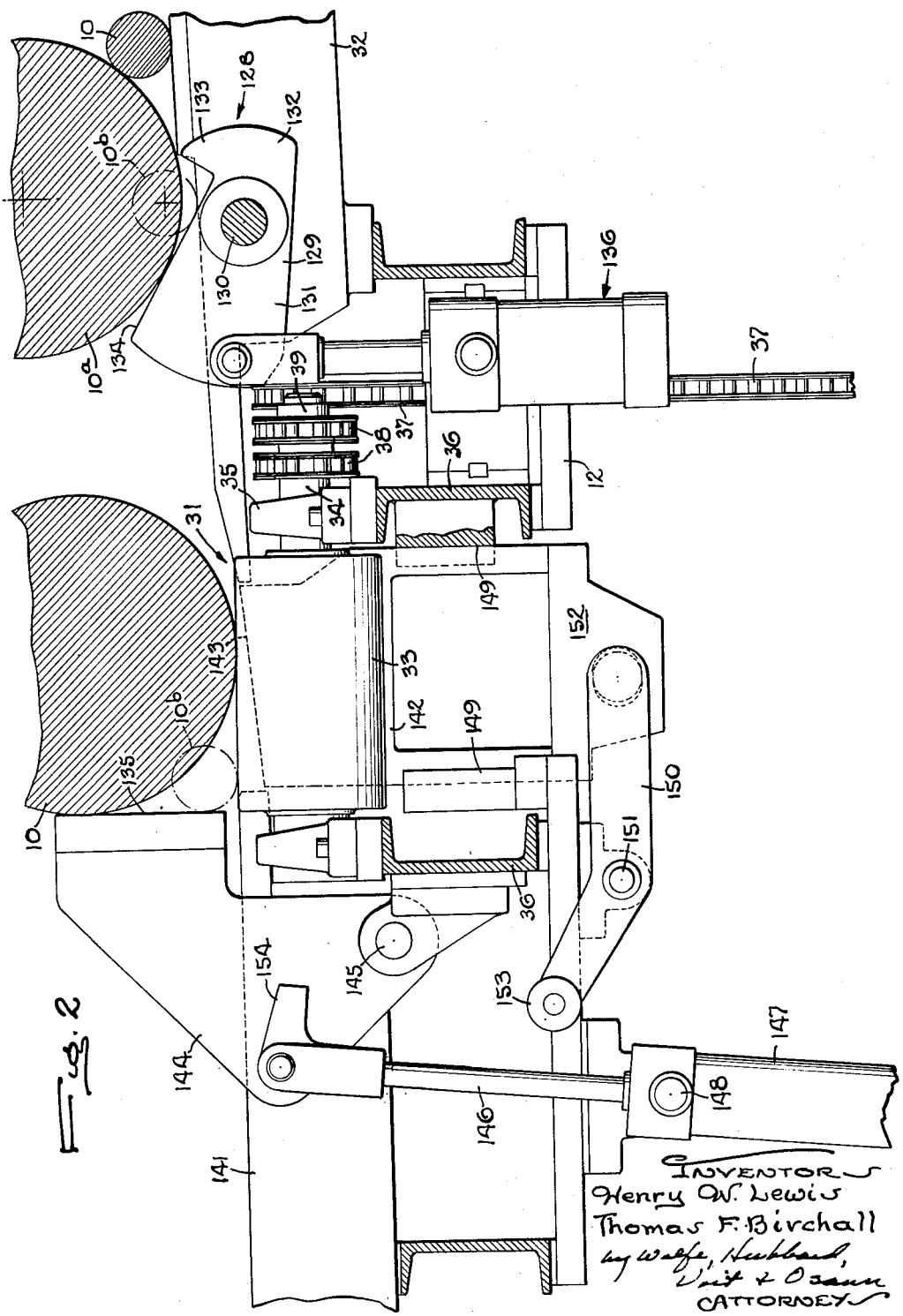

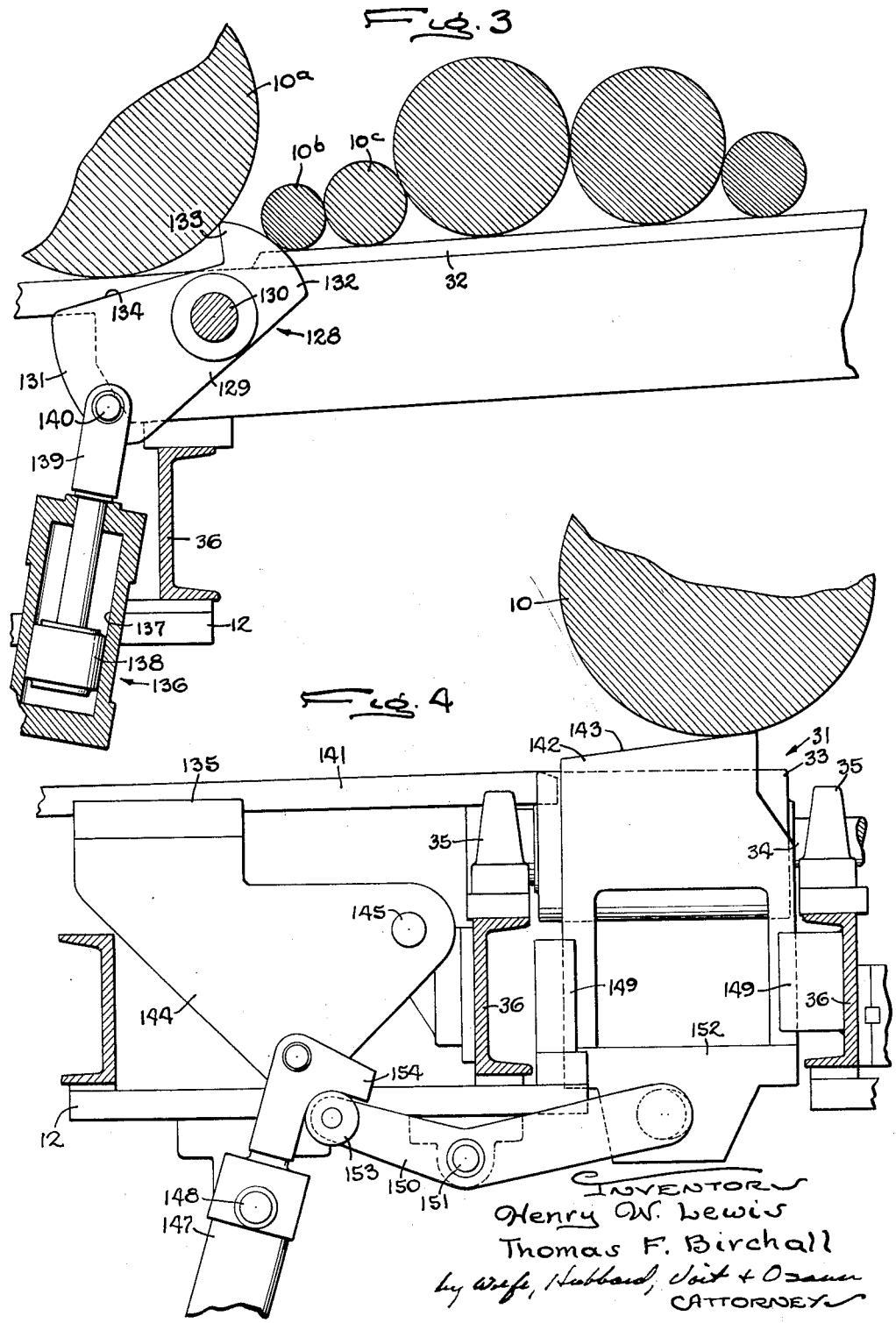

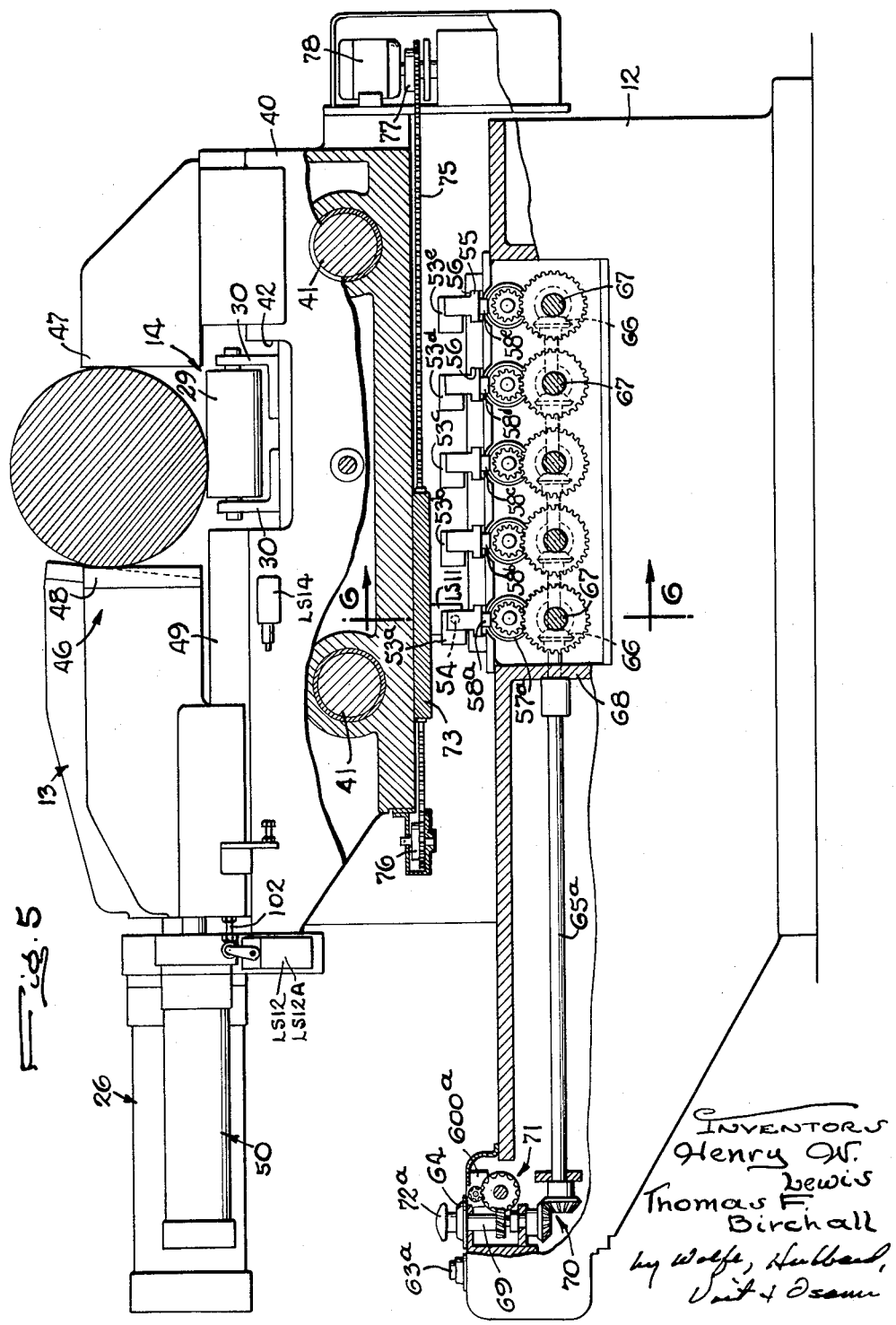

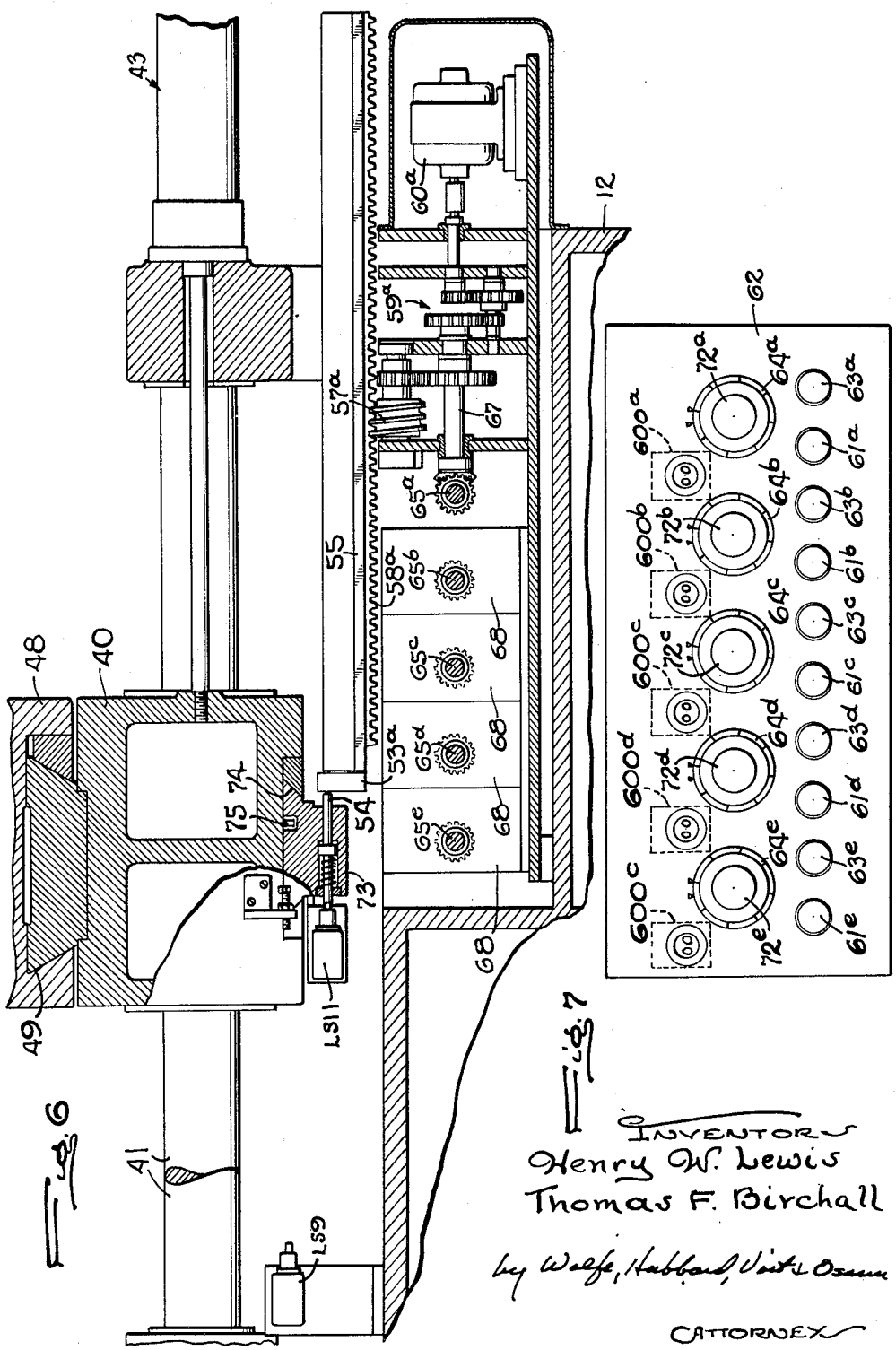

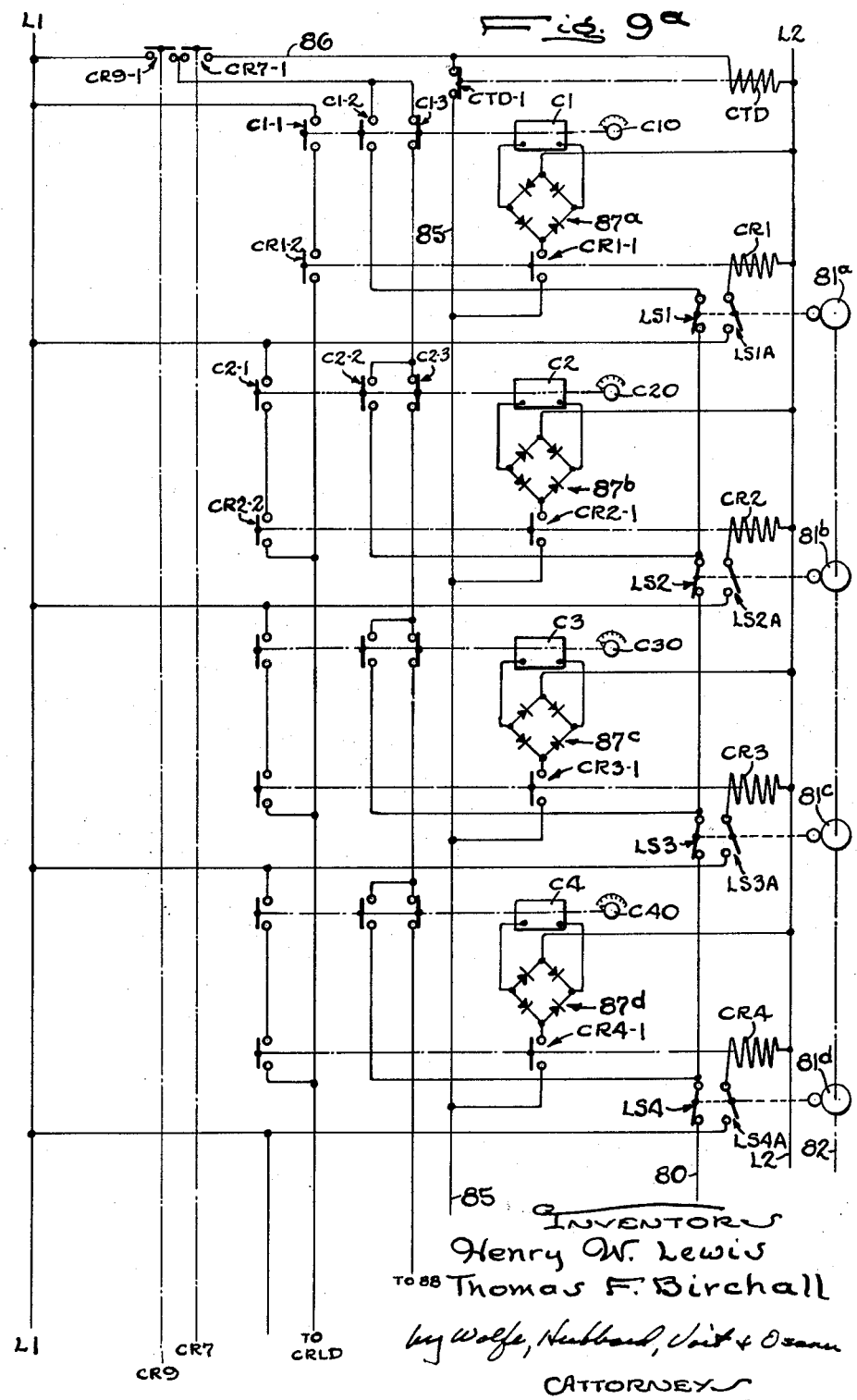

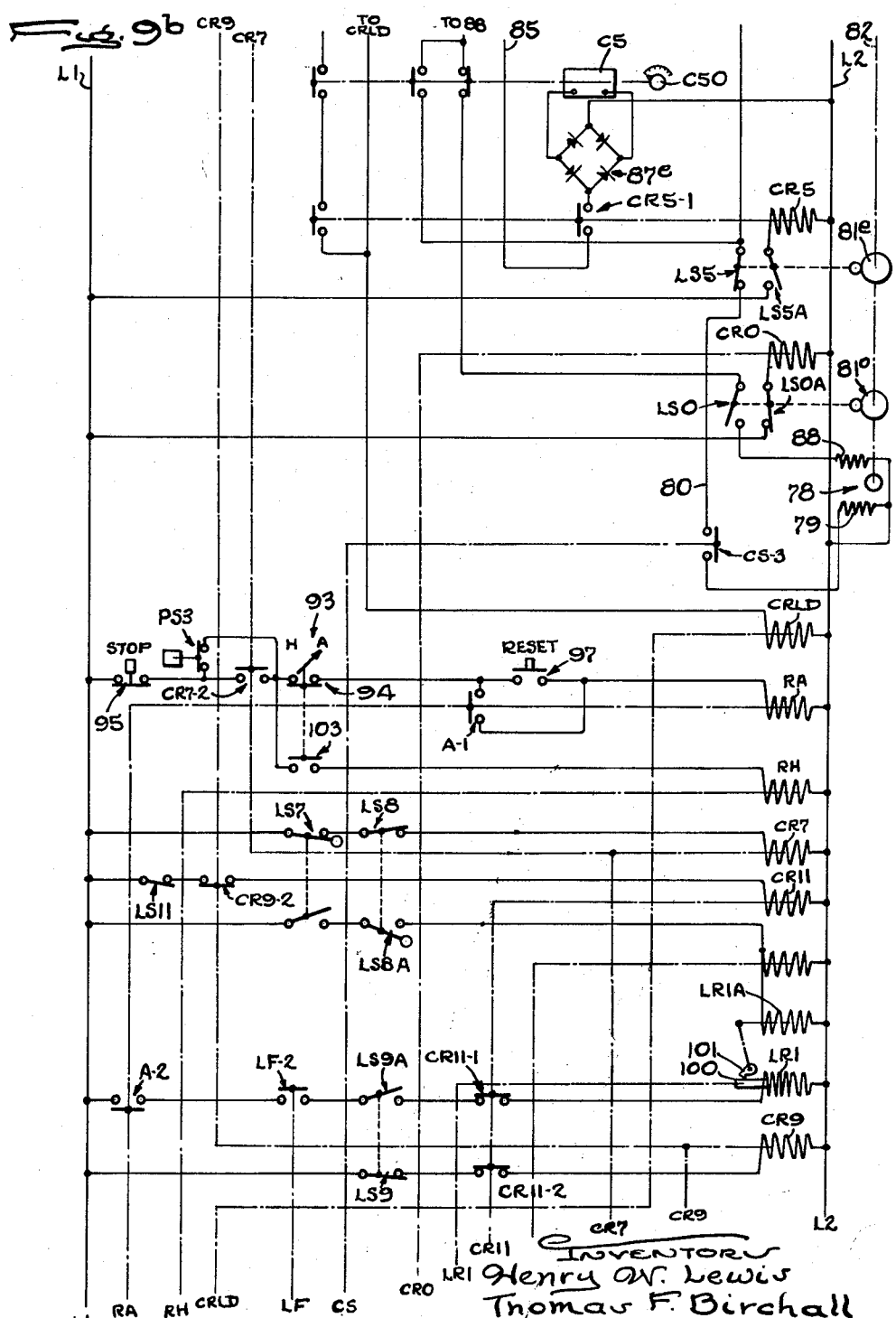

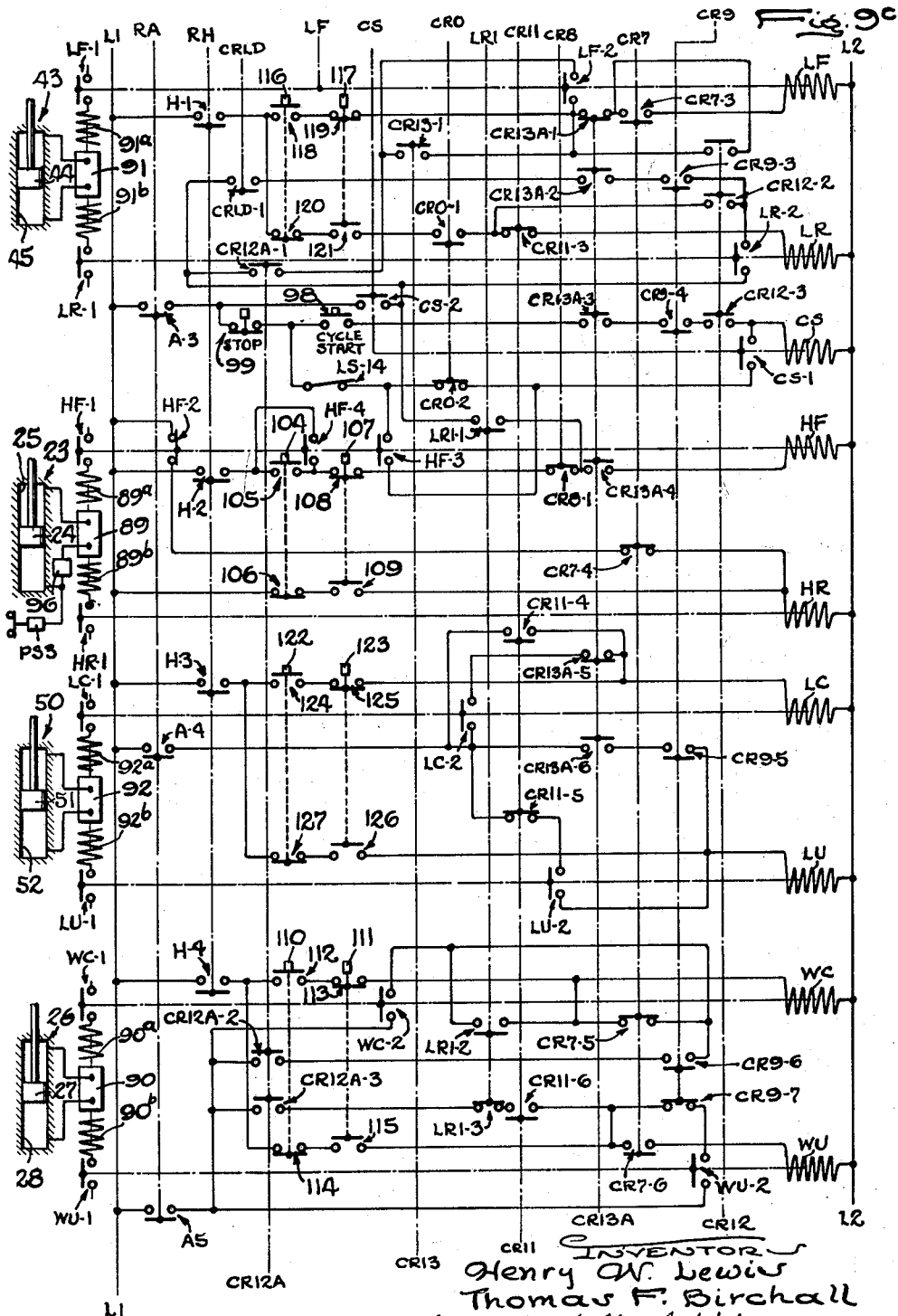

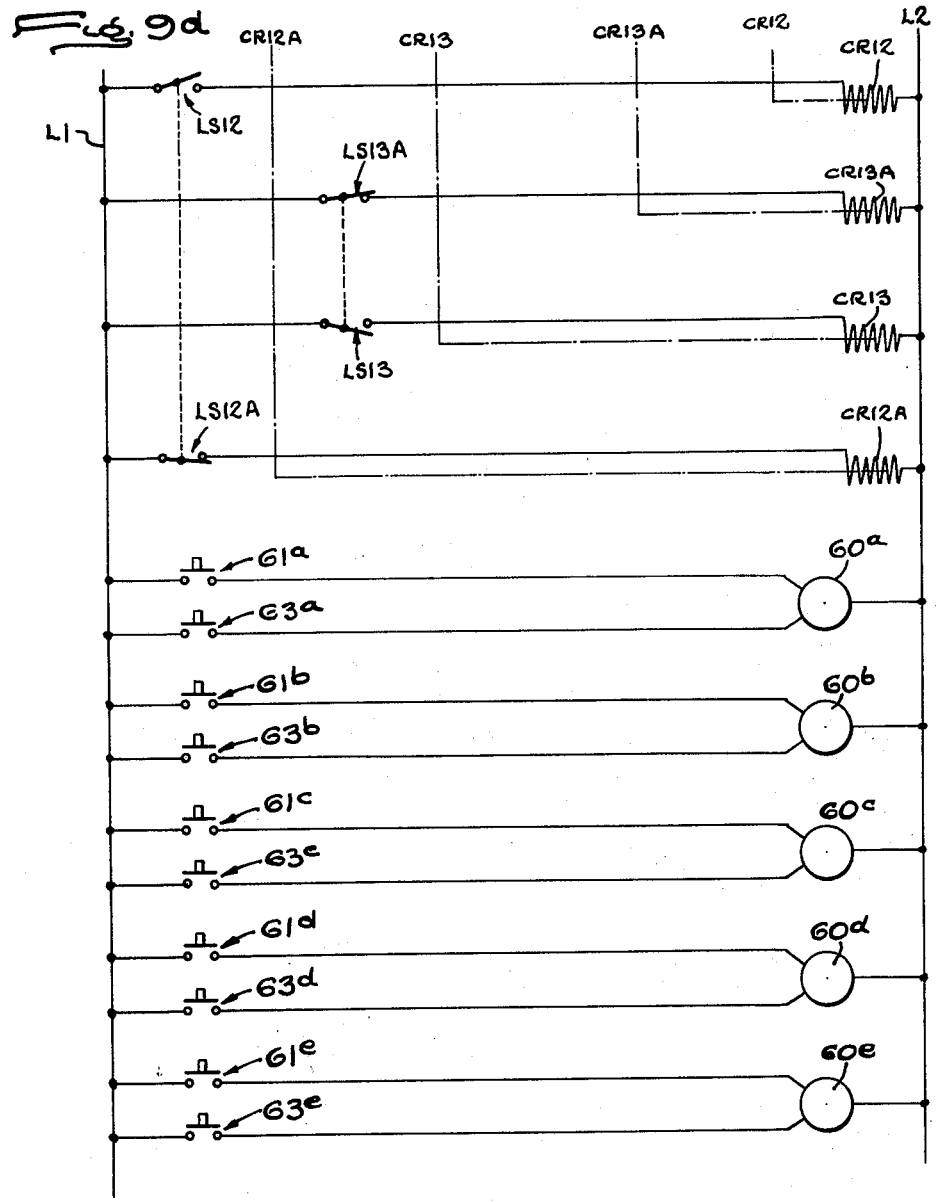

United States Patent Office 3,157,333
Patented Nov. 17, 1964

3,157,333
MACHINE FOR OPERATING ON ELONGATED
WORKPIECES
Henry Walter Lewis and Thomas F. Birchall, Rockford,
Ill., assignors to The Ingersoll Milling Machine Co.,
Rockford, Ill., a corporation of Illinois
Filed May 12, 1961, Ser. No. 109,745
8 Claims. (Cl. 226—135)

This invention relates to a machine for operating on elongated workpieces such as a machine for cutting workpieces of varying lengths from comparatively long bars of metal stock and, more particularly, to a machine in which a tool operates on the work while the latter is clamped to a stationary table.

The general object of the invention is to provide a new and improved machine of the above character which, between operations of the tool, automatically advances the workpieces through steps which vary in length according to a preselected program.

Another object is to arrange the machine so that it not only advances workpieces through varying steps but also advances the work through a preselected number of steps of each length.

A more detailed object is to advance the workpiece preparatory to each operation of the tool by a slide whose advancing stroke always terminates at the same position but whose return stroke is variable in length and automatically controlled according to a preset sequence whereby the length of each advance of the workpiece corresponds to the length of the preceding return stroke of the slide.

A further object is to use a plurality of stop devices which successively limit the return movement of the slide and which are individually adjustable so that each stop causes the machine to advance the workpiece of a different length.

Still another object is to incorporate in the machine a novel counting mechanism which determines which stop device shall be effective for each return stroke of the slide whereby each stop may be effective to control a preselected number of strokes of the slide.

The invention also resides in a novel escapement mechanism which controls the loading of successive workpieces onto a table where they are advanced by the slide.

Other objects and advantages of the invention will become apparent from the following detailed description taken in connection with the accompanying drawings, in which FIGURE 1 is a fragmentary plan view of a machine constructed in accordance with the present invention.

FIG. 2 is an enlarged fragmentary sectional view taken along the line 2—2 in FIG. 1.

FIG. 3 is a fragmentary view corresponding to the right hand portion of FIG. 2 but showing the parts in a different position.

FIG. 4 is a fragmentary view corresponding to the left hand portion of FIG. 2 but showing the parts in a different position.

FIG. 5 is an enlarged sectional view taken along the line 5—5 in FIG. 1, parts being broken away and shown in section.

FIG. 6 is an enlarged fragmentary sectional view taken along the line 6—6 in FIG. 5.

FIG. 7 is a plan view of the control panel.

FIG. 8 is a fragmentary schematic perspective view of the slide, the stop mechanism and associated parts.

FIG. 9a is a schematic wiring diagram of the control mechanism.

FIG. 9b is a schematic wiring diagram forming a continuation of the bottom of FIG. 9a.

FIG. 9c is a schematic wiring diagram forming a continuation of the bottom of FIG. 9b.

FIG. 9d is a schematic wiring diagram forming a continuation of the bottom of FIG. 9c.

While the invention has been described in connection with a saw for cutting workpieces from a long bar 10 of metal stock, it should be understood that the invention also is applicable to other machine tools where it is desirable to advance a workpiece through a succession of measured steps. In the form of the invention illustrated in the drawings, the machine includes a cutting tool or saw blade 11 (FIG. 1) mounted on a base 12 adjacent a stationary clamp 13 which holds the bar 10 during the sawing operation, the bar being supported by an elongated table 14 disposed beneath and between the jaws 15 and 16 of the clamp 13.

Herein, a circular saw blade 11 is employed and is fast on a spindle 17 which is journaled in a head 18 adjacent one end of an arm 19 and driven by a motor 20 through a suitable speed reducer 21. Intermediate its ends, the arm 19 is pivotally supported by trunnions 22 upstanding from the base 12 and the arm is turned about the horizontal axis of the trunnions by a power actuator 23, shown schematically in FIG. 9c as a piston 24 sliding in a cylinder 25, to bring the saw blade 11 into engagement with the bar 10.

The jaw 15 constitutes the fixed jaw of the clamp 13 and is mounted rigidly on the base 12 while the movable jaw 16 is slidable on the base toward and away from the fixed jaw. Such sliding is effected by a reversible hydraulic actuator 26 comprising a piston 27 and a cylinder 28 (FIG. 9c). As shown in FIGS. 1 and 5, the table 14 which supports the bar 10 while the latter is clamped between the jaws is formed by a plurality of horizontal rollers 29 journaled between parallel plates 30 which are supported at opposite ends by the base 12. The table constitutes an extension of a horizontal conveyor 31 (FIG. 1) which receives the bars 10 one at a time from a platform 32 alongside the conveyor and which delivers the bar to the table. The conveyor comprises a plurality of horizontal rollers 33 which are alined with the rollers 29 of the table 14 and which are keyed to shafts 34 (FIG. 2) journaled in bearings 35, the latter being supported by channel beams 36 on the base 12. The rollers 33 are driven by a suitable motor (not shown) through chains 37 and 38 engaging sprocket wheels 39 fast on extensions of the shafts 34.

To advance the bar 10 along the table 14 preparatory to cut off by the saw blade 11, a slide 40 moves back away from the blade, then grips the bar and moves forward thereby sliding the bar along the table. The slide advances the bar after each cutting operation and after the arm 19 has raised the blade. Since, prior to the advance, the end of the bar is in the plane of the blade, the length of the next workpiece cut from the bar is determined by the length of travel of the bar.

As shown most clearly in FIG. 5, the slide 40 is a block sliding on cylindrical ways 41 which are supported by the base 12 and extend horizontally on opposite sides of the table 14, the top of the slide being channeled as indicated at 42 to receive the table. The slide 40 is moved back and forth along the ways 41 by a hydraulic power actuator 43 (FIG. 6) which herein is a piston 44 and a cylinder 45 (FIG. 9c). At the end of the backward stroke of the slide 40, that is, when the slide is furthest from the saw blade 11, the slide grips the bar 10 on the table 14. The work clamp 13 then being open, forward movement of the slide advances the bar along the table to position the bar for the next cut off operation. For this purpose, a gripping means is carried by the slide and this means may, as shown in FIGS. 1 and 5, be a clamp 46 similar to the clamp 13. Thus, the clamp 46 comprises a fixed jaw 47 secured to the slide and a movable jaw 48 sliding transversely of the slide on ways 49 and opposing the fixed jaw. The jaw 48 is moved back and forth by a power actuator 50 which in this instance is similar to the actuator 23 for the clamp 26 and comprises a piston 51 sliding in a cylinder 52 (FIGS. 8 and 9c).

In accordance with the present invention, the movement of the slide 40 is controlled in a novel manner to advance the bar 10 through precise distances and thereby position the bar for the cutting of workpieces of varying lengths. Preferably, the arrangement is such that the slide advances the bar to cut a preselected number of workpieces of one length, then another preselected number of workpieces of a different length and so on. The operator of the machine merely locates the bar 10 on the table 14 and selects the lengths and number of workpieces to be cut. Thereafter, the machine operates automatically until all the workpieces have been cut from the bar.

To achieve the foregoing, the slide 40 always returns to the same position on each forward stroke and novel means is provided for selectively limiting the backward or return stroke so that the length of the backward stroke determines the distance the bar 10 is advanced on the subsequent forward stroke and hence the length of the workpiece next cut from the bar. This means comprises a plurality of adjustable stop elements 53 (the stops being distinguished by lettered superscripts in FIGS. 5 and 8) which coact with a sensing device 54. The stop elements are set individually for the different lengths of workpieces to be cut and, on each backward stroke of the slide 40, the sensing device cooperates with a selected one of the stop elements to reverse the direction of slide movement. As preselected by the operator of the machine, the sensing device coacts with one of the stop elements until the desired number of pieces has been cut to the length produced by that stop element. Then, the sensing device cooperates with another stop element to cut pieces to a second length and this is continued with each stop element until the proper number of pieces of each length has been cut.

In the present instance, the sensing device 54 is the actuator of a limit switch LS11 mounted on the slide 40 and the stop elements 53 are elongated bars adjustably supported on the base 12. The bars 53 extend longitudinally of the table 14 and are spaced apart laterally while the limit switch LS11, which is in the plane of the bars, is mounted to move transversely of the slide. Thus, the switch may be positioned selectively in alinement with any one of the bars so that, on the return stroke of the slide, that bar actuates the switch to terminate the rearward movement of the slide. The bars are adjustable endwise and thereby set the length of the stroke of the slide.

As shown in FIGS. 5, 6 and 8, each bar 53 is formed with lateral flanges 55 sliding in ways 56 in the base 12 to guide the bars for endwise adjustment. Such adjustment is effected by individual worm gears $57^a$ through $57^e$ meshing with racks $58^a$ through $58^e$ on the undersides of the bars. Through speed reducing gearing $59^a$ through $59^e$, the worm gears are driven by reversible motors $60^a$ through $60^e$. Push button switches $61^a$ through $61^e$ (see FIG. 7) mounted on a panel 62 are effective to turn the motors in one direction while similar push button switches $63^a$ through $63^e$ energize the motors in the reverse direction. The switch $61^a$, for example, causes the motor $60^a$ to turn in a direction which moves the bar $53^a$ forward thereby shortening both the stroke of the slide 40 and the length of the piece cut by the saw 11 when the limit switch LS11 is alined with this bar. To increase the length of the workpiece, the switch $63^a$ is depressed to move the bar $53^a$ back.

In order to indicate the precise position of each of the bars 53, the motors $60^a$ through $60^e$ drive counters $60^a$ through $60^e$ and dials $64^a$ through $64^e$ on the panel 40. This is achieved through shafts $65^a$ through $65^e$ which are driven by the gearing $59^a$ through $59^e$ through bevel gears 66 and shafts 67. The shafts 65 are journaled in plates 68 (FIG. 6) and drive upright shafts 69 through the medium of bevel gears 70. The dials are keyed to the upright shafts (FIG. 5) which also drive the counters through gear trains 71. Conveniently, each revolution of a dial may represent one inch of movement of the corresponding bar. In such a case, the counters indicate the number of whole inches which the bars 53 move from a zero position and the dials indicate fractions of an inch. Normally, the motors 60 are used to obtain a rough setting of the bars 53 after which the final setting may be made accurately by hand by turning knobs $72^a$ through $72^e$ which are fast on the upper ends of the shafts 69.

To move the switch LS11 transversely of the slide 40 and into alinement with a selected one of the bars 53, the switch is mounted on a carriage 73 (FIGS. 5 and 8) which slides in dovetailed ways 74 (FIG. 6) extending across the underside of the slide. The carriage is secured to one run of an endless chain 75 which extends around an idler sprocket wheel 76 at one side of the slide 40 and around a driven sprocket wheel 77 at the other side, the sprocket wheel 77 being turned by a reversible motor 78.

As shown in FIGS. 9a and 9b, the winding 79 for turning the motor 78 forward to traverse the carriage from left to right as viewed in FIGS. 5 and 8 is connected across power lines L1 and L2 by a line 80. In the latter are normally closed limit switches LS1, LS2, LS3, LS4 and LS5 which are actuated by cams $81^a$ through $81^e$ respectively, each of the switches corresponding to one of the bars 53. The cams are keyed to a common shaft 82 (FIGS. 5 and 8) which is driven in synchronism with the carriage 73 by the motor 78 through gears 83. The cams are timed to open the switch LS1 when the limit switch LS11 is alined with the bar $53^a$, to open the switch LS2 when the limit switch is alined with the bar $53^b$ and so on. Thus, each cam is effective to stop the carriage 73 with the limit switch LS11 alined with the corresponding bar.

In order to cut a preselected number of workpieces of each length, that is, at each position of the carriage 73, counters C1 through C5 are associated with the switches LS1 through LS5, there being a counter for each switch. The counters are of the so-called "count-down" type and are set manually by dials C10, C20, C30, C40 and C50 on a panel 84 (FIG. 8). The counters are conditioned for counting by the cams $81^a$ through $81^e$ and, for this purpose, normally open switches LS1A through LS5A are mechanically connected to the switches LS1 through LS5 respectively so as to be closed by the corresponding cams and complete the circuits of relays CR1 through CR5. Thus, when the cam $81^a$ opens the switch LS1 and closes the switch LS1A, the relay CR1 is energized closing contacts CR1-1 of that relay. Through a line 85, the normally closed contacts CTD-1 of a time relay CTD and a line 86, the contacts CR1-1 complete the input circuit of a rectifier $87^a$ and the counter CR1 is connected across the output of the rectifier. This conditions the counter so that, each time the relay CTD is energized, the counter counts down one unit. As will be explained later, the relay CTD is energized once during each cycle of the slide 40. From FIGS. 9a and 9b, it will be seen that the contacts CTD-1 are in the circuits of the rectifiers $87^a$ through $87^e$ for all of the counters whereby the relay CTD is effective to operate whichever counter is activated by the cams 81.

When the counter C1 is in the zero position, its contacts C1-1 and C1-2 are open and the contacts C1-3 are closed but, as soon as the counter is moved away from the zero position, it mechanically closes contacts C1-1 and C1-2 and opens contacts C1-3. The contacts C1-1 are in the circuit of a relay CRLD (FIG. 9b) as are the contacts CR1-2 of the relay CR1. As will be described later, the relay CRLD controls the movement of the slide 40. The contacts C1–2 are in the circuit of the forward coil 79 of the motor 78, this circuit being completed through the switches LS1 through LS5, while the contacts C1–3 are in the circuit of the reverse coil 88. The latter circuit also includes a switch LSO which, like the switches LS1 through LS5, is actuated by a cam 81° on the shaft 82 and is opened when the carriage 73 locates the limit switch LS11 in the starting position to the left of the bar 53ª as viewed in FIG. 5.

The other counters C2 through C5 are similarly constructed and connected. Thus, the counter C2 is conditioned by the contacts CR2–1 of the relay CR2 whose contacts CR2–2 together with the counter contacts C2–1 complete a parallel circuit for the relay CRLD. The contacts C2–2 are in the circuit of the forward coil 79 but by pass the switch LS1 through the contacts C1–3 while the contacts C2–3 are in the circuit of the reverse coil 88.

With the foregoing arrangement, a cycle of operation may be begun with the carriage 73 in the starting position and the counters C1 through C5 set. In that condition, the circuit of the reverse coil 88 of the motor 78 is open at the contacts C1–3 and the circuit of the forward coil 79 is closed through the contacts C1–2 and the switches LS1 through LS5. The motor 78 then advances the carriage 73 and simultaneously turns the camshaft 82 until the cam 81ª opens the switch LS1 and closes the switch LS1A at which time the limit switch LS11 is alined with the bar 53ª. The switch LS1 being in the circuit of the forward coil 79, the motor then stops. Closing of the switch LS1A energizes the relay CR1 which completes the circuit for the counter C1 and, with the contacts C1–1, also completes the circuit of the relay CRLD which controls the movement of the slide 40. Upon each cycle of the latter, the time relay CTD is de-energized to open the circuit of the counter and cause the latter to count one.

When the counter C1 has counted down to zero, the contacts C1–1 and C1–2 will open and the contacts C1–3 will close. The latter completes a parallel circuit for the forward motor coil 79 through the contacts C2–2 and the switches LS2 through LS5 so that the motor 78 is energized even though the switch LS1 is open. The carriage 73 then is driven until the switch LS11 is alined with the bar 53ᵇ when the cam 81ᵇ opens the switch LS2 and de-energizes the motor. The simultaneous closing of the switch LS2A conditions the counter C2 which functions in the same manner as the counter C1. The operation is repeated through all positions of the carriage 73 as represented by the cams 81ª through 81ᵉ. If one of the counters is not set, the carriage moves past the corresponding bar 53 and on to the next bar. For example, if the counter C2 had been at zero when the counter C1 had counted out, a parallel circuit for the motor coil 79 would have been completed through the contacts C1–3 and C2–3 and through the switches LS3 through LS5 and the motor would have remained energized until this circuit was opened at the switch LS3 by the cam 81ᶜ. After all of the counters have counted down to zero, the circuit of the reverse coil 88 is completed by the contacts C1–3 through C5–3 and the motor 78 drives the carriage 73 back to the zero position in which the cam 81° opens the switch LSO in the circuit of the reverse coil 88 to stop the motor.

Each of the hydraulic actuators 23, 26, 43 and 50 are controlled by solenoid operated valves 89, 90, 91 and 92 (FIG. 9c). Thus, the valve 89 which controls the actuator 23 for feeding and retracting the saw head 18 is actuated by solenoids 89ª and 89ᵇ, the solenoid 89ª being effective to feed the saw into the work while the solenoid 89ᵇ retracts the saw. Similarly, the slide 40 is moved forward to advance the work by energizing a solenoid 91ª which actuates the valve 91 while a solenoid 91ᵇ reverses this valve to retract the slide. The clamp actuators also are controlled by solenoid valves, solenoids 90ª and 90ᵇ acting on the valve 90 respectively to close and open the work clamp 13 while solenoids 92ª and 92ᵇ actuate the valve 92 to close and open the slide clamp 46.

The various solenoids for the valves 89, 90, 91 and 92 are energized by individual relays. Thus, the contacts HF–1 of a relay HF complete the circuit of the solenoid 89ª to feed the saw 11 into the work while the contacts HR–1 of a relay HR complete the circuit of the solenoid 89ᵇ to retract the saw head 18. A relay LF, when energized, closes contacts LF–1 in the circuit of the solenoid 91ª to move the slide 40 forward while the latter is returned under the control of a relay LR whose contacts LR–1 complete the circuit of the solenoid 91ᵇ. The main clamp 13 for the work is closed by a relay WC whose contacts WC–1 complete the circuit of the solenoid 90ª and this clamp is opened under the control of a relay WU which has contacts WU–1 in the circuit of the relay of the solenoid 90ᵇ. In a like manner, the clamp 46 on the slide 40 is closed by energizing the relay LC to close the contact LC–1 in the circuit of the solenoid 92ª and is opened by energizing the relay LU to close the contacts LU–1 in the circuit of the solenoid 92ᵇ.

The relays for operating the solenoid valves are energized automatically and in the proper sequence under the control of various other relays. The latter, in turn, are under the control of manual switches and limit switches which respond to the movements of the different parts of the machine.

The control circuit is conditioned for automatic operation by energizing a relay RA (FIG. 9b). This is achieved by throwing a manual switch 93 to the automatic position (position A) thereby closing contacts 94 in the circuit of the relay RA. This circuit also includes the normally closed contacts of a STOP switch 95 which may be of the push button type and the normally closed contacts of a pressure sensitive switch PS3. As shown in FIG. 9c, the pressure sensitive switch is connected to the head end of the actuator 23 for the saw head 18 and is ahead of a pressure regulator 96. Thus, if the saw blade 11 becomes dull, there will be a pressure drop which will be sensed by the pressure switch PS3 and the latter will open the circuit of the relay RA and thereby disable the entire machine. Finally, the relay RA is energized by closing a push button reset switch 97 and, when the relay is energized, it completes its own holding circuit through the contacts A–1.

To initiate a cycle of the machine, a cycle relay CS (FIG. 9c) is energized by closing cycle start switch 98, the circuit of the relay being completed through a push button stop switch 99 and through the contacts A–3 of the relay RA which, at that time, is energized. Also in the circuit of the relay CS are the normally opened contacts CR13A–3, CR9–4 and CR12–3 of relays CR13A, CR9 and CR12 (FIGS. 9b and 9d). Energization of these three relays indicates respectively that the work clamp 13 is closed, the slide 40 is forward and the slide clamp 46 is open, these being the proper positions for these parts at the start of a cycle as will be explained later. When the cycle relay CS is energized, it completes its own holding circuit through the contacts CS–1 and through a limit switch LS14. The latter opens if the slide clamp 46 should close without there being a workpiece in place (see FIG. 5).

Mechanically connected to the limit switch LSO (FIG. 9b) is a limit switch LSOA which, therefore, is also operated by the cam 81°. When the carriage 73 is in the zero position, the cam 81° closes the switch LSOA which thereby completes the circuit of the relay CRO. Contacts CRO–2 of the relay CRO are in the holding circuit for the cycle relay CS. This holding circuit also includes a parallel circuit around the contacts CRO–2 and through the contacts HF–3 of the relay HF which controls the forward or cutting movement of the saw head 18.

With this arrangement, the cycle start switch 98 energizes the cycle relay CS whose contacts CS-3 complete the circuit for the forward coil 79 of the motor 78. As a result, the carriage 73 immediately moves away from the zero position so that the limit switch LSOA opens to de-energize the relay CRO and close the contacts CRO-2 thereby completing one of the holding circuits for the cycle relay CS. Under normal operating conditions, therefore, the cycle relay will remain energized throughout the entire cycle of the machine and until the carriage returns to the zero position at which time the relay CRO again will be energized and the contacts CRO-2 opened to break the holding circuit for the cycle relay. If, at that time, the saw head is on a cutting stroke, the relay CS will remain energized through the parallel holding circuit which includes the contacts HF-3, the relay HF being energized at this time. The parallel holding circuit will not open until the cutting stroke has been completed and the return of the saw head commenced and this insures that the cycle will not terminate until the saw head reaches its starting position.

Certain operations, such as the forward movement of the slide 40 and the opening of the work clamp 13, require that the saw head 18 be returned to its starting position. This is achieved under the control of a relay CR7 (FIG. 9b). In the circuit of this relay are two limit switches LS7 and LS8. The limit switch LS7 is normally opened and is closed by the saw head 18 when it is in its upper position and the limit switch LS8 is normally closed and is opened when the saw head reaches its lower position, that is, at the lowest depth of cut of the saw blade 11. Similarly, other operations, such as the closing of the work clamp 13 and the opening of the slide clamp 46, require that the slide 40 be in the forward position. This condition is under the control of a relay CR9 (FIG. 9b) whose circuit includes a limit switch LS9. As shown in FIG. 6, this switch is mounted on the base 12 of the machine and is located in such a position as to be engaged by the slide 40 when the latter is at the end of its forward stroke, the switch LS9 then being closed and the relay CR9 energized.

Also interposed in the control circuit is a latch relay LR1 (FIG. 9b) whose circuit is completed through the contacts A-2 of the relay RA, the contacts LF-2 of the relay LF and a limit switch LS9A. The contacts A-2 are closed when the circuit is set for automatic operation, the contacts LF-2 are closed when the slide 40 is moving forward under the control of a relay LF and the limit switch LS9A is mechanically connected to the limit switch LS9 so that it is closed when the slide is out of the forward position. Thus, the relay LR1 is energized as the slide moves forward but before it reaches the end of the forward stroke. Upon being energized, the relay LR1 shifts its armature 100 which then is engaged by a latch 101 to hold the armature in the shifted position even after the limit switch LS9A opens. The latch is tripped to release the armature by energizing a relay LR1A whose circuit is completed through limit switches LS7A and LS8A. These limit switches are mechanically connected to the limit switches LS7 and LS8 respectively so that the limit switch LS7A is closed when the saw head moves away from its upper position and the limit switch LS8A is closed when the head reaches its lowermost or full depth position. Thus, the latch 101 is tripped when the saw head 18 reaches the end of its cutting stroke.

As described above, the slide 40 is under the control of the limit switch LS11 which engages the bars 53 to stop the return movement of the slide. This is achieved by placing the limit switch in the circuit of a relay CR11 whose normally closed contacts CR11-3 (FIG. 9c) are in the circuit of the relay LR, the latter being the relay which energizes the actuator 43 in a direction to return the slide. Also included in the circuit of the relay CR11 are the normally closed contacts CR9-2 of the relay CR9 to serve as an interlock. Similarly, the contacts CR11-1 and CR11-2 of the relay CR11 function as interlocks in the circuits of the relays LR1 and CR9 respectively.

As described above, the relay CRLD prevents the slide 40 from being returned while the carriage 73 is moving from one position to the next. This is achieved by energizing the relay through any one of five different parallel circuits, there being one such circuit associated with each of the counters C1 through C5. Each such circuit includes contacts of the counter and contacts of the associated relay. Thus, the first circuit is completed by the contacts C1-1 of the counter C1 and by the contacts CR1-2 of the relay CR1. When the carriage is moving, all of the relays CR1 through CR5 are de-energized. Hence, all of the energizing circuits for the relay CRLD are open and this relay, therefore, is de-energized. Normally open contacts CRLD-1 (FIG. 9c) are in the energizing circuit of the relay LR which, therefore, can be energized only when the carriage dwells at one of its positions.

Limit switches LS12 and LS12A control those functions which depend upon the slide clamp 46 being either open or closed. These limit switches are mounted on the slide 40 and are actuated when the clamp 46 is fully opened by a pin 102 (FIG. 5) rigid with the movable jaw 48 of this clamp. As shown in FIG. 9d, the limit switches LS12 and LS12A are mechanically connected and are arranged so that the limit switch LS12 is closed when the slide clamp 46 is in the fully open position while the limit switch LS12A closes as soon as the movable jaw 48 begins to move toward the clamping position. When closed, the limit switch LS12 completes the circuit of a relay CR12 and the limit switch LS12A completes the circuit of a relay CR12A.

Similarly, limit switches LS13 and LS13A (FIG. 1) control those operations which depend upon the work clamp 13 being either open or closed. These switches are actuated by a pin 103 (FIG. 1) which is fast on the movable jaw 16 of the clamp 13 and which closes the limit switch LS13 when this jaw is in the fully retracted position, the limit switch LS13A being closed as soon as the jaw begins to move forward to clamp a workpiece. The limit switches LS13 and LS13A complete the circuits of relays CR13 and CR13A respectively.

As stated earlier, the counters C1 through C5 are normally energized through the contacts CTD-1 of the relay CTD and a count is made when the counters are de-energized by opening these contacts. The relay CTD is energized to make a count each time the slide 40 reaches the forward position. For this purpose, the contacts CR9-1 of the relay CR9 are in the energizing circuit of the relay CTD, the relay CR9 being energized by the slide in its forward position. Also in the circuit of the relay CTD are the contacts CR7-1 of the relay CR7 which is energized when the saw head 18 is returned to its upper position. Normally, the saw head has been returned before the slide reaches its forward position so that the contacts CR7-1 are closed first and the count is made in response to the closing of the contacts CR9-1.

From FIG. 9a it will be observed that the contacts CR9-1 and CR7-1 are in the circuit of the counters in series with the contacts CTD-1 of the relay CTD. Thus, if the circuit of a counter should be energized, opening of the contacts CR9-1 or of the contacts CR7-1 would produce a count. To prevent this and to insure that a count is made only in response to the energization of the relay CTD, the latter is a time delay relay and is arranged to remain energized until the slide 40 has begun its return movement at which time the relay CR9 is de-energized and the contacts CR9-1 open. In this way, the circuit of the counter remains open through the contacts CTD-1 until it is also open through the contacts CR9-1 and this prevents the occurrence of a false count. It will be noted that the contacts CR9-1 also are in the circuits of the forward and reverse coils 79 and 88 of the motor 78 and serve as interlocks in these circuits.

With the foregoing arrangement, the relay HF which controls the forward or cutting movement of the saw head 18 is energized through a circuit including the contacts CR13A-4 of the relay CR13A, the contacts LR1-1 of the latch relay LR1, the contacts CS-2 of the cycle relay CS and the contacts A-3 of the automatic relay RA. The contacts LR1-1 are closed until the saw head reaches its full depth position so that the circuit of the relay HF is initially energized by the closing of the contacts CR13A-4 which are closed when the work clamp 13 moves to its closed position to clamp the workpiece 10.

To retract the saw head 18, the relay HR is energized, the circuit of this relay including the normally closed contacts HF-2 of the relay HF and the normally closed contacts CR7-4 of the relay CR7. The contacts HF-2 provide an interlock to prevent the relay HR from being energized while the saw head is moving down. When the head reaches its lowermost position, the limit switch LS8A is opened to de-energize the relay CR7 so that the contacts CR7-4 close.

In the circuit for the relay WC, which causes the work clamp 13 to close, are the normally open contacts LR1-2 of the relay LR1, the normally open contacts CR9-6 of the relay CR9, the normally open contacts CR12A-2 of the relay CR12A and the contacts A-5 of the relay RA. The contacts LR1-2 and CR12A2 condition the circuit of the relay WC, the contacts LR1-2 having been closed when the slide 40 was last retracted to energize and latch the relay LR1 and the contacts CR12A2 having been closed when the slide clamp 46 was closed. Actual energization of the relay WC occurs when the contacts CR9-6 are closed. This happens when the limit switch LS9 is closed by the slide 40 reaching its forward position, the relay CR9 being then energized.

Preferably, the work clamp 13 is closed before the saw head 18 begins its cutting stroke and remains closed until the head returns to its starting position. To this end, the relay WC is kept energized through two parallel holding circuits, one extending through the contacts LR1-2 of the relay LR1 and the contacts WC-2 of the relay WC while the other extends through the contacts CR7-5 of the relay CR7 and the contacts WC-2. Since the relay LR1 is energized and latched when the saw head is in its upper position, the holding circuit through the contacts LR1-2 is completed as soon as the relay WC is energized. Although this circuit opens as soon as the saw head reaches its lowermost position, the parallel holding circuit was completed as soon as the head moved away from its starting position through the contacts CR7-5 and this circuit remains closed until the head has been fully retracted at which time the relay WC is de-energized.

After the bar stock 10 has been cut and the saw head 18 retracted to its starting position, the work clamp 13 is opened by closing the contacts CR7-6 to energize the relay WU. These contacts are closed when the relay CR7 is energized in response to the closing of the limit switches LS7 and LS8, this condition occurring when the saw head 18 has been fully retracted. Also in the circuit of the relay WU are the normally opened contacts CR11-6, the normally closed contacts LR1-3, the normally open contacts CR12A-3 and the contacts A-5 of the automatic relay RA. The contacts CR11-6 insure that the clamp 13 remains closed until the slide 40 has been returned at which time the relay CR11 is energized. The latch relay LR1 is energized and then latched and is not tripped to close the contacts LR1-3 until the saw head 18 reaches full depth thereby insuring that the clamp 13 remains closed while the saw 11 is making the cut. The contacts CR12A-3 were closed previously when the relay CR12A was energized in response to the closing of the slide clamp 46. A holding circuit for the relay WU is completed through normally opened contacts CR7-6, normally closed contacts CR9-7 and the contacts WU-2 of the relay WU so that this circuit is opened and the relay de-energized either when the head 18 starts down to de-energize the relay CR7 or when the slide 40 reaches the forward position thereby energizing the relay CR9.

While the saw 11 is making a cut, the slide 40 is returned to its retracted position and, when the saw head 18 is raised back to its starting position, the slide is moved forward to advance the workpiece 10 for the next cut. This is achieved by closing the contacts CR7-3 which complete the circuit of the relay LF and cause the actuator 43 to advance the slide. The relay CR7 is energized to close the contacts CR7-3 when the saw head is up as sensed by the limit switches LS7 and LS8. In addition, the energizing circuit of the relay LF includes the normally closed contacts CR13A-1, the normally open contacts CR13-1, the normally open contacts CR12A-1 and the contacts CS-2 and A-3 of the cycle and automatic relays CS and RA respectively. The contacts CR13A-1 are closed when the work clamp 13 is open as sensed by the limit switch LS13A which opens the circuit of the relay CR13A. The contacts CR13-1 are closed by the relay CR13 which is energized through the limit switch LS13 when the work clamp is open. The contacts CR12A-1 insure that the slide clamp 46 is closed before the slide is moved forward, this being achieved by the limit switch LS12A which energizes the relay CR12A. A holding circuit for the relay LF includes the contacts LF-2 and parallels the contacts CR13-1 so that the relay LF remains energized until the work clamp 13 closes at which time the the relay LF is de-energized by the opening of the contacts CR13A-1.

To retract the slide 40, the relay LR is energized by the closing of the contacts CR13A-2 and CR12-2. The former are closed when the work clamp 13 is closed thereby energizing the relay CR13A while the latter are closed when the relay CR12 is energized in response to the opening of the slide clamp 46. The energizing circuit for the relay LR is completed through the normally closed contacts CR11-3, the normally open contacts CR9-3, the normally open contacts CRLD-1 and the contacts CS-2 and A-3 of the cycle and automatic relays CS and RA respectively. The contacts CR11-3 are closed until the relay CR11 is energized upon the complete return of the slide 40 as indicated by the limit switch LS11 being opened by one of the bars 53. The contacts CR9-3 are closed when the slide 40 is forward and energizes the relay CR9 while the contacts CRLD-1 are closed only when the carriage 73 is not moving so that the slide does not return as the carriage advances from one position to the next. A holding circuit for the relay LR is completed through the contacts CR11-3, CR12-2, LR-2, CS-2 and A-3 and this circuit is opened through the contacts CR11-3 when the slide 40 is returned to the position in which the limit switch LS11 is open.

After the slide 40 has been returned, its clamp 46 is closed preparatory to the next advance of the bar stock 10. This is achieved by energizing the relay LC through the normally open contacts CR11-4 and the contacts A-4, the contacts CR11-4 being closed when the limit switch LS11 energizes the relay CR11 upon the full return of the slide. A holding circuit for the relay LC is completed through the normally closed contacts CR13A-5 and the contacts LC-2 so that the relay remains energized and the clamp 46 closed after the slide 40 begins its forward stroke. The holding circuit is opened and the relay LC de-energized after the workpiece has been gripped by the work clamp 13 as sensed by the limit switch LS13A which energizes the relay CR13A and opens the contacts CR13A-5.

When the slide 40 has moved forward to advance the workpiece and the latter has been gripped by the work clamp 13, the slide clamp is opened by energizing the relay LU whose circuit extends through contacts CR9-5, CR13A–6 and A–4. The contacts CR9–5 are closed in response to the completion of the forward stroke of the slide, this being achieved by the closing of the limit switch LS9 which thereby energizes the relay CR9. The circuit of the relay LU is completed by the closing of the work clamp 13 which thereby closes the limit switch LS13A to energize the relay CR13A and to close the contacts CR13A–6. When energized, the relay LU completes its own holding circuit through contacts LU–2 and CR11–5. When the slide is fully retracted, the limit switch LS11 opens to de-energize the relay CR11 and open the contacts CR11–5 thereby de-energizing the relay LU preparatory to the next closing of the slide clamp.

All of the actuators 23, 26, 43 and 50 are adapted for individual manual energization. For this purpose, the switch 93 (FIG. 9b) is shifted from the automatic position (position A) to the hand position (position H). This opens the contacts 94 in the circuit of the automatic relay RA and closes contacts 103 in the circuit of hand relay RH. The circuit of relay RH is completed through the pressure sensitive switch PS3 and the STOP push button switch 95. In some conditions of manual operation, the pressure in the saw head actuator 23 may be insufficient to maintain the pressure switch PS3 closed. Accordingly, a parallel circuit for the relay RH is completed through the contacts CR7–2. This circuit, however, is completed only when the saw head 18 has been returned to its upper position and the relay CR7 is thereby energized.

Associated with each of the actuators 23, 26, 43 and 50 are two push button switches, one being effective to energize the actuator in the opposite direction. Thus, a push button switch 104 (FIG. 9c) has normally open contacts 105 in an energizing circuit for the relay HF and normally closed contacts 106 in the energizing circuit for the relay HR while a push button switch 107 is provided with normally closed contacts 108 in the energizing circuit of the relay HF and normally open contacts 109 in the energizing circuit of the relay HR. Thus, the push button switch 104 may be actuated to complete a circuit for the relay HF through the contacts H–2, 105, 108, CR8–1 and CR13A–4. When this circuit is completed, it energizes the actuator 23 to feed the saw 11 into the workpiece. The contacts CR13A–4, which are closed only when the work clamp 13 is closed, insure that the work is properly held during the cut. After the energizing circuit is completed by depressing the push button switch 104, a holding circuit is completed through the contacts HF–4 which parallel the contacts of the push button switch 105. When the cut has been completed, the holding circuit is opened through the contacts CR8–1 of the relay CR8 when the latter is energized by the closing of the limit switches LS7A and LS8A, these switches being closed by the saw head 18 when it reaches the low depth position. To return the saw head to its upper position, the push button switch 107 is depressed opening contacts 108 in the circuit of relay HF and closing contacts 109 which complete the energizing circuit of the relay HR, the latter then being effective to energize the saw head actuator 23 in the return direction.

Similar push button switches 110 and 111 are employed in the circuits of the work clamp relays WC and WU. The relay WC, which is effective when energized to cause the work clamp 13 to be closed, is completed through the contacts H–4, the normally open contacts 112 of the push button switch 110 and the normally closed contacts 113 of the push button switch 111 so that this relay is energized when the push button switch 110 is depressed to close the contacts 112. The work clamp is opened by depressing the push button switch 111 which thereby completes the circuit for the relay WU through the contacts H–4 and CR7–6 and the contacts 114 and 115 of the push button switches 110 and 111. Since the contacts CR7–6 are closed only when the relay CR7 is energized upon the saw head 18 being in its upper position, the work clamp 46 will be opened manually only when the saw blade 18 is fully retracted.

In the manual circuits for the relays LF and LR, which control the forward and return movements of the slide 40, are the contacts of push button switches 116 and 117. When depressed, the push button switch 116 closes the contacts 118 to complete the circuit of the relay LF to move the slide 40 forward, this circuit being completed through the contacts H–1 of the relay RH, the contacts CR13A–1 and the normally closed contacts 119 of the other push button switch 117. The contacts CR13A–1 are normally closed and are open only when the relay CR13A is energized which occurs when the work clamp 13 is closed so that the slide 40 will not be moved forward until the work clamp has been opened. Depressing the push button switch 116 also opens the mechanically connected interlock contacts 120 in the manual circuit of the relay LR to prevent this relay from being energized while the slide is being moved forward. To return the slide manually, the push button switch 117 is depressed to open contacts 119 in the manual circuit of the relay LF and to close the contacts 121 in the circuit of the relay LR. This latter circuit is completed through the contacts H–1, CRO–1 and CR11–3. The contacts CRO–1, which are open whenever the carriage 73 is moving in between positions, insure that the slide 40 will not be returned while the carriage is advancing from one position to the next. When the slide has returned far enough that the limit switch LS11 is opened by one of the bars 53, the relay CR11 is energized to open the contacts CR11–3 and open the circuit of the relay LR thereby de-energizing the slide actuator 43.

Manual control of the actuator 50, which opens and closes the slide clamp 46, is effected by the push button switches 122 and 123. Depressing the push button switch 122 opens the manual circuit of the relay LU and completes the manual circuit of the relay LC through the contacts H–3 of the hand relay RH, the contacts 124 of the push button switch 122 and the normally closed contacts 125 of the other push button switch 123. When completed, this circuit energizes the relay LC and causes the actuator 50 to close the slide clamp 46. The latter is opened manually by depressing the push button switch 123 which opens contacts 125 in the circuit of the relay LC and completes the circuit of the relay LU through its contacts 126, the contacts 127 of the push button switch 122 and the contacts H–3, the relay LU reversing the actuator 50.

The present invention also contemplates the provision of a novel escapement mechanism 128 (FIGS 1 through 4) which releases the work bars 10 one at a time from the platform 32 to roll onto the conveyor 31 and this even though the successive bars vary widely in diameter. To this end, the escapement mechanism includes a horizontal lever 129 fulcrumed on shaft 130 which parallels the conveyor and is disposed beneath the platform 32. One arm 131 of the lever projects above the platform so that the next bar to be released rests against and is held by this arm. On the other arm 132 of the lever is a projection 133 which points upwardly but which normally is disposed beneath the platform. In the position of the lever shown in FIG. 2, the projection is always behind the center of the bar 10a held by the arm 131 and head of the center of the next bar 10b whereby counterclockwise swinging of the lever releases the first bar and catches the second.

In order that lever 129 operates effectively for a wide variety of bar diameters, the upper edge 134 of the arm 131 is, when the lever is in the normal or holding position shown in FIG. 2, inclined at an angle so that the center of the bar 10a being held, regardless of its size, is held behind the center of the fulcrum shaft 130. Also the tip of the projection 133 is spaced from this center a distance approximately equal to the diameter of the smallest bar to be handled. The platform 32 is inclined slightly downwardly so that the innermost bar rests against the edge 134, the other bars are in edge-to-edge relation, and the innermost bar rolls onto the conveyor 31 when released by the lever 129. The released bar is held in alinement with the work and slide clamps 13 and 46 by an abutment 135 (FIG. 2).

To rock the lever 129 back and forth between the holding position (FIG. 2) and the releasing position (FIG. 3), a reversible hydraulic actuator 136 is mounted on the base 12 and connected to the outer end of the arm 131. The actuator includes a cylinder 137 mounted to rock on the base and a piston 138 whose rod 139 is pivotally connected to the arm 131, the actuator being activated by a suitable manual control (not shown). Herein, a plurality of levers 129 are employed and, as shown in FIG. 1, are spaced along the length of the platform 32, on the shaft 130, one of the levers being connected by a horizontal pin 140 which forms the pivotal connection between the end lever and the piston rod 139.

After the required number of workpieces have been cut from a bar 10, the remaining length of the bar is retracted by opening the work clamp 13, closing the slide clamp 46 and moving the slide 40 back, these operations being effected through the use of the push buttons 111, 122 and 117. This places at least a part of the bar on the conveyor 31 which then is driven in the reverse direction to place the bar alongside a rack 141 disposed next to the conveyor on the side opposite the platform 32.

To roll the returned bar 10 from the conveyor 31 to the rack 141, vertical plates 142 disposed between the rollers 33 of the conveyor and having inclined upper edges 143 are raised from a position below the rollers (see FIG. 2) to the position (FIG. 3), the bar rolling down the inclined edges 143 and onto the rack. Simultaneously, the abutment 135 is lowered below the level of the rack to permit such rolling. In the form shown in the drawings, the abutment 135 is formed by the ends of a plurality of levers 144 spaced along the length of the rack (FIG. 1) and fulcrumed by a shaft 145 which connects the levers and is journaled on the base 12. The levers 144 swing from an active position (FIG. 2) in which the ends 135 are vertical and an inactive position (FIG. 4) in which the levers are disposed wholly below the supporting surface of the rack.

To turn the levers 144 between the active and inactive positions, the piston rod 146 of a reversible hydraulic actuator 147, which is pivotally supported at 148 on the base 12, is linked to one of the levers. The levers are swung to the inactive position by shifting the piston rod downwardly and the final downward movement of the rod is used to raise the plates 142 which slide up and down in guides 149. For this purpose, a bell crank lever 150 is fulcrumed at 151 on the base 12 between the actuator 147 and the lower end of one of the plates. One arm of the bell crank lever is connected to a horizontal bar 152 which interconnects the plates and the other arm carries a follower roller 153. The roller is engaged by a hook 154 on the upper end of the piston rod 146 during the final downward movement of the latter and this rocks the lever to raise the plates.

*Operation*

Normally, the operation of the machine is completed with the slide 40 forward and the carriage 73 in the zero position. To set up the machine for a new operation with the parts in this position, the switch 93 is turned to the "H" or hand operation position. The slide then is returned by manually depressing the push button switch 117 which energizes the relay LR so that the actuator 43 moves the slide back. Since, at that time, the carriage is not alined with any of the stop bars 53, the slide returns through the full stroke of the actuator. After the slide has been returned, the actuator 136 (FIG. 3) is energized to swing the escapement lever 129 and release the first bar 10 of stock which then rolls from the platform onto the conveyor 31. Next, the conveyor is driven in the forward direction to advance the leading end of the stock between the jaws 47 and 48 of the slide clamp 46, the stock projecting beyond this clamp a distance at least equal to the width of the work clamp 13.

With the stock between the jaws of the slide clamp 46, the latter is closed by depressing the push button switch 122 to complete the circuit of the relay LC and energize the actuator 50 in the clamp closing direction. Then, the push button switch 116 is depressed to energize the relay LF and reverse the actuator 43 so that the slide makes its forward stroke. When this has been completed, the actuator 26 closes the work clamp 13, this being effected by manually depressing the push button switch 110 to energize the relay WC. Next, the push button switch 123 is depressed to energize the relay LU and open the slide clamp 46 and the push button switch 104 is depressed to complete the circuit of the relay HF. The latter energizes the actuator 23 which feeds the cutter 11 into the work. The cutter thereby squares the end of the work and, when the cut has been completed, the push button switch 107 is depressed thereby energizing the relay HR and raising the saw head 18.

Next, the operator sets the positions of the stop bars 53 by depressing the push button switches 61 and 63 and by manually manipulating the knobs 72. The stop bars are set so that the bar at the first position controls the cutting of the shortest workpieces and the successive bars control the cutting of progressively larger workpieces. The operator also manually sets the counters C1 through C5 according to the number of workpieces to be cut of each size. The machine is then ready for automatic operation.

To start the automatic operation of the machine, the switch 93 (FIG. 9b) is turned to the "A" position and the reset push button switch 97 is depressed to energize the relay RA. Next, the cycle start push button switch 98 is depressed to energize the cycle relay CS (FIG. 9c) and the contacts CS-3 of this relay complete the circuit of the forward coil 79 of the carriage motor 78. Thus, the carriage 73 is advanced until the cam 81$^a$ opens the switch LS1 and closes the limit switch LS1A. Opening of the limit switch LS1 breaks the circuit of the motor 78 which thereby stops the carriage with the limit switch LS11 alined with the first stop bar 53$^a$. With the limit switch LS1A closed, the relay CR1 is energized and closes the contacts CR-1 to condition the counter C1 for operation.

Energization of the relay CR1 closes the contacts CR1-2 in the circuit of the relay CRLD, this circuit being completed through the contacts C1-1 of the counter C1 which is closed at that time because of the count remaining on the counter. The relay CRLD completes the circuit of the relay LR which energizes the actuator 43 to return the slide. The return movement of the slide is terminated when the limit switch LS11 is closed by the stop 53$^a$ to energize the relay CR11 and open the contacts CR11-3 in the circuit of the relay LR.

When the relay CR11 is energized, it also is effective to complete the circuit of the relay LC so that the actuator 50 closes the slide clamp 46 whereby the work bar 10 will be advanced on the next forward movement of the slide. Such forward movement takes place upon the closing of this slide clamp, the limit switch LS12A thereby being closed to energize the relay CR12A which in turn energizes the relay LF. The slide moves forward until its clamp 46 abuts against the clamp 13. It will be seen, therefore, that the work 10 has been advanced a distance equal to the forward stroke of the slide and that the distance of this stroke is determined by the positioning of the stop bar 53$^a$.

Upon completion of the forward stroke of the slide 40, the limit switch LS9 is closed to energize the relay CR9. The latter energizes the relay CTD which opens the circuit of the counter C1 and causes the counter to count down one unit. The relay CR9 also energizes the relay WC which causes the actuator 26 to close the work clamp 13. As the work clamp moves to its closed position, the limit switch LS13A is closed and energizes the relay CR13A which de-energizes the relays LC and LF for closing the slide clamp 46 and moving the slide 40 forward respectively. In the meantime, the relay CR9 has completed the circuit of the relay LU which is effective to open the slide clamp. When energized, the relay CR13A conditions the circuit of the relay LR and this circuit then is completed by the relay CR12 which is energized by the limit switch LS12 when the slide clamp 46 is completely open. The relay LR then energizes the actuator 43 to return the slide.

When the work clamp 13 was closed, the relay CR13A completed the circuit of the relay HF which thereupon energized the actuator 23 to lower the saw head 18 and feed the cutter 11 into the work. When the cut is completed and the head 18 reaches its full depth position, the limit switches LS7A and LS8A close to trip the latch relay LR1 which, in turn, de-energizes the relay HF. The normally closed contacts HF-2 of the relay HF complete the circuit of the relay HR which causes the actuator 23 to raise the head to its starting position.

When the slide 40 returns to the point where the limit switch LS11 is opened again by the stop bar 53ª, the cycle is repeated and this continues until the counter C1 counts down to zero. When the counter reaches zero, its contacts C1-1 and C1-2 open and the contacts C1-3 close. This completes a shunt circuit for the forward coil 79 of the motor 78, the circuit extending through the limit switches LS2 through LS5, the contacts C2-2 of the counter C2 and the contacts C1-3 of the counter C1. As a result, the motor 78 drives the carriage 73 forward until the cam 81ᵇ opens the limit switch LS2 and closes the limit switch LS2A at which time the limit switch LS11 is alined with the second stop bar 53ᵇ. The cycle described above then is repeated in connection with the second stop bar as many times as is set by the counter C2. In the same manner, the carriage 73 advances to the third, fourth and fifth positions and the machine cuts the desired number of pieces for each of the lengths set by the stops 53ᶜ, 53ᵈ and 53ᵉ.

As soon as the last counter C5 has counted down to zero, the circuit for the reverse coil 88 of the motor 78 is completed through the limit switch LS0 and the counter contacts C1-2 through C5-2. The motor 78 then drives the carriage 73 back to the zero position in which the cam 81º opens the limit switch LS0 and closes the limit switch LS0A. This completes the cycle by energizing the relay CR0 which opens the circuit of the cycle relay CS.

To unload the unused stock, the switch 93 is turned to the hand position "H." Next, the push button switch 122 is depressed to close the slide clamp 46 and the push button switch 117 is closed to return the slide. The latter carries the stock back until at least a portion of it is resting on the conveyor 31 which then is driven in a reverse direction until the stock is completely alongside the rack 141. At that time, the actuator 136 (FIGS. 2 and 4) is energized to swing the abutment levers 144 below the rack and to raise the plates 142 which roll the stock from the conveyor to the rack. The machine then is ready to cut workpieces from the next bar of stock.

We claim as our invention:

1. In a machine for operating on elongated workpieces, the combination of, a base adapted to support a workpiece, a slide mounted on said base to move toward and away from a predetermined position, a tool operable on the workpiece supported on said base, gripping means carried by said slide and adapted to grip the workpiece and advance the same toward said tool as the slide moves toward said position, a plurality of stop elements mounted on said base and spaced apart transversely of the direction of movement of said slide, said elements being spaced different distances from said position, a sensing device mounted on said slide to move transversely thereof for selective alinement with said stop elements, said sensing device and the selected one of said elements producing a signal when adjacent each other, and counting mechanism automatically moving said sensing device across said slide to position the sensing device successively in alinement with each of said stop elements for a preset number of strokes of said slide.

2. In a machine for operating on an elongated workpiece, the combination of, a base member adapted to support the workpiece, a slide member mounted on said base member to move toward and away from a predetermined position, a tool operable on the workpiece on said base member, gripping means carried by said slide member and adapted to grip the workpiece and advance the same toward said tool as the slide moves toward said position, a plurality of stop elements mounted on one of said members and spaced apart transversely of the direction of movement of said slide member, said elements being spaced different distances from said position, a sensing device mounted on the other of said members to move transversely of the direction of slide movement to be alined with a selected one of said stop elements, said sensing device and the selected one of said elements producing a signal when adjacent each other, a reversible power actuator operable to move said slide member away from said position and reversible in response to said signal whereby the selected stop element determines the length of advance of the workpiece, and counting mechanism automatically moving said sensing device to position the same successively in alinement with each of said stop members for a preset number of strokes of said slide member.

3. In a machine for operating on elongated workpieces, the combination of, an elongated base member adapted to support a workpiece, a tool operable on the workpiece, a slide member mounted on said base to move back and forth lengthwise of the base, a reversible power actuator operable to advance said slide forward toward said tool to a predetermined position and to retract the slide, a clamp mounted on said slide to grip the workpiece on said base, means operable to close said clamp when the slide is retracted and to open said clamp after the slide reaches said predetermined position whereby the slide advances the workpiece on the forward stroke, a plurality of adjustable stops mounted on one of said members, a sensing device mounted on the other of said members to move relatively away from and toward said stops upon forward and retracting movement of said slide, means for positioning said device in alinement with a selected one of said stops, and counting mechanism automatically controlling said means and operable to position said sensing device successively in alinement with each of said stops for a preset number of strokes of said slide, said power actuator being responsive to said device and de-energized thereby to terminate retraction of said slide so that each advance of the workpiece corresponds in length to the adjusted position of the effective stop.

4. In a machine for operating on elongated workpieces, the combination of, a base adapted to support a workpiece, a slide mounted on said base to move toward and away from a predetermined position, a tool operable on the workpiece supported on said base, gripping means carried by said slide and adapted to grip the workpiece and advance the same toward said tool as the slide moves toward said position, a plurality of stop elements mounted on said base and spaced apart transversely of the direction of movement of said slide, said elements being spaced different distances from said position, a carriage mounted on said slide to move transversely thereof, a switch mounted on said carriage, means for moving said carriage relative to said slide to position said switch selectively in alinement with one of said stop elements, and a reversible power actuator operable to move said slide member away from said position and reversible in response to said switch engaging the selected one of said stop elements whereby the selected element determines the length of advance of the workpiece.

5. In a machine for operating on elongated workpieces, the combination of, a base adapted to support a workpiece, a slide mounted on said base to move toward and away from a predetermined position, a tool operable to cut a workpiece supported on said base, gripping means carried by said slide and adapted to grip the workpiece and advance the same toward said tool as the slide moves toward said position, a plurality of stop elements mounted on said base and spaced apart transversely of the direction of movement of said slide, said elements being spaced different distances from said position, a sensing device mounted on said slide to move transversely thereof for selective alinement with said stop elements, said sensing device and the selected one of said elements producing a signal when adjacent each other, and a reversible power actuator operable to move said slide away from said position and reversible in response to said signal whereby the selected stop element determines the length of advance of the workpiece.

6. In a machine for operating on elongated workpieces, the combination of, a base member adapted to support a workpiece, a stationary clamp mounted on said base member and operable to grip and hold the workpiece supported by the base member, a tool disposed on one side of said clamp to operate on the workpiece, a slide member mounted on the other side of said clamp to move on the base member toward and away from the clamp, a second clamp mounted on and bodily movable with said slide member to grip the workpiece and advance the same through said stationary clamp, a plurality of stop elements mounted on one of said members and spaced apart transversely of the direction of movement of said slide member, said elements being spaced different distances from said position, a sensing device mounted on the other of said members to move transversely of the direction of slide movement to be alined with a selected one of said stop elements, said sensing device and the selected one of said elements producing a signal when adjacent each other, and a reversible power actuator operable to move said slide member away from said position and reversible in response to said signal whereby the selected stop element determines the length of advance of the workpiece.

7. In a machine for operating on elongated workpieces, the combination of, an elongated base member adapted to support a workpiece, a stationary clamp mounted on said base and operable to grip and hold a workpiece by the base, a tool disposed on one side of said clamp to operate on the workpiece, a slide member mounted on the other side of said clamp to move on the base toward and away from the clamp, a second clamp mounted on and bodily movable with said slide to grip the workpiece and advance the same through said stationary clamp, a reversible power actuator operable to advance said slide forward to a predetermined position in which said second clamp is adjacent said stationary clamp and to retract the slide, means operable to close said clamp when the slide is retracted and to open said clamp after the slide reaches said predetermined position whereby the slide advances the workpiece on the forward stroke, a plurality of adjustable stops mounted on one of said members, a sensing device mounted on the other of said members to move relatively away from and toward said stops upon forward and retracting movement of the slide, and means for positioning said device in alinement with a selected one of said stops, said power actuator being responsive to said device and de-energized thereby to terminate retraction of said slide so that the advance of the workpiece corresponds in length to the adjusted position of the selected stop.

8. In a machine for operating on elongated workpieces, the combination of, a base member adapted to support a workpiece, a slide member mounted on said base member to move toward and away from a predetermined position, a tool for operating on a workpiece on said base member, gripping means carried by said slide member and adapted to grip a workpiece and advance the same toward said tool as the slide moves toward said position, a plurality of stop elements mounted on one of said members and spaced apart transversely of the direction of movement of said slide member, said elements being spaced different distances from said position, a sensing device mounted on the other of said members to move transversely of the direction of slide movement to be alined with a selected one of said stop elements, said sensing device and the selected one of said elements producing a signal when adjacent each other, and a reversible power actuator operable to move said slide member away from said position and reversible in response to said signal whereby the selected stop element determines the length of advance of the workpiece.

References Cited in the file of this patent

UNITED STATES PATENTS

| | | |
|---|---|---|
| 1,947,591 | Guhloff | Feb. 20, 1934 |
| 2,707,101 | Giskes | Apr. 26, 1955 |
| 2,719,713 | Erhardt | Oct. 4, 1955 |
| 2,787,466 | Strandberg | Apr. 2, 1957 |
| 2,856,186 | Weymouth | Oct. 14, 1958 |
| 2,929,626 | Weymouth | Mar. 22, 1960 |

FOREIGN PATENTS

| | | |
|---|---|---|
| 490,770 | Canada | Feb. 24, 1953 |